United States Patent
Aboul-Magd et al.

(10) Patent No.: US 10,237,910 B2
(45) Date of Patent: Mar. 19, 2019

(54) WAKE-UP-RECEIVER FRAME PERMITTING IDENTIFICATION BY NON-COMPATIBLE RECEIVER

(71) Applicants: Osama Aboul-Magd, Ottawa (CA); Jung Hoon Suh, Ottawa (CA); Kwok Shum Au, Ottawa (CA)

(72) Inventors: Osama Aboul-Magd, Ottawa (CA); Jung Hoon Suh, Ottawa (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/496,988

(22) Filed: Apr. 25, 2017

(65) Prior Publication Data
US 2018/0020409 A1 Jan. 18, 2018

Related U.S. Application Data

(60) Provisional application No. 62/441,687, filed on Jan. 3, 2017, provisional application No. 62/362,473, filed on Jul. 14, 2016.

(51) Int. Cl.
*H04L 27/26* (2006.01)
*H04W 40/00* (2009.01)
(Continued)

(52) U.S. Cl.
CPC .......... *H04W 76/28* (2018.02); *H04L 27/2602* (2013.01); *H04L 27/2692* (2013.01);
(Continued)

(58) Field of Classification Search
CPC ...... H04W 84/12; H04L 5/0007; H04L 69/22; Y02D 70/00
See application file for complete search history.

(56) References Cited

U.S. PATENT DOCUMENTS 6,622,251 B1  9/2003  Lindskog et al.
9,131,399 B2  9/2015  Liu et al.
(Continued)

FOREIGN PATENT DOCUMENTS

CN    1960365 A    5/2007
CN    101087220 A  12/2007
(Continued)

OTHER PUBLICATIONS

U.S. Appl. No. 62/362,410, titled "Frame Format and Design of Wake-Up Frame for a Wake-Up Receiver", filed Jul. 14, 2016.
(Continued)

*Primary Examiner* — Chandrahas B Patel

(57) ABSTRACT

Methods and systems for formatting and transmitting a wake-up signal for electronic devices having a wake-up receiver circuit. A low-power wake-up signal is transmitted, the wake-up signal comprising a wake-up frame including a legacy preamble decodable by legacy electronic devices and a wake-up packet decodable by the wake-up receiver circuit in a non-legacy electronic device. The legacy preamble includes information detectable by at least one of the legacy electronic devices indicating that the wake-up frame is not a valid frame for the at least one legacy electronic device, such as where the legacy electronic device is a IEEE 802.11n/ac/ax device.

20 Claims, 3 Drawing Sheets

(51) Int. Cl.
*H04W 52/02* (2009.01)
*H04W 72/04* (2009.01)
*H04W 76/28* (2018.01)
*H04W 84/12* (2009.01)

(52) U.S. Cl.
CPC ..... *H04W 40/005* (2013.01); *H04W 52/0206* (2013.01); *H04W 52/0235* (2013.01); *H04W 72/0446* (2013.01); *H04W 84/12* (2013.01); *Y02D 70/00* (2018.01)

(56) References Cited

U.S. PATENT DOCUMENTS

| | | | |
|---|---|---|---|
| 9,883,473 B2* | 1/2018 | Azizi | H04W 56/001 |
| 2003/0031120 A1 | 2/2003 | Miyato et al. | |
| 2004/0233973 A1 | 11/2004 | Fullerton et al. | |
| 2005/0237161 A1 | 10/2005 | Lee et al. | |
| 2006/0248208 A1 | 11/2006 | Walbeck et al. | |
| 2007/0076683 A1 | 4/2007 | Chung et al. | |
| 2007/0174916 A1 | 7/2007 | Ching | |
| 2007/0195911 A1 | 8/2007 | Ochi | |
| 2007/0273484 A1 | 11/2007 | Cederlof et al. | |
| 2008/0056219 A1 | 3/2008 | Venkatachalam | |
| 2008/0122584 A1 | 5/2008 | Itasaki et al. | |
| 2008/0303636 A1 | 12/2008 | Chatte et al. | |
| 2010/0260159 A1 | 10/2010 | Zhang et al. | |
| 2011/0090977 A1 | 4/2011 | Zhong | |
| 2011/0122938 A1 | 5/2011 | Kameya | |
| 2012/0151028 A1 | 6/2012 | Lu et al. | |
| 2012/0191995 A1 | 7/2012 | Naveh et al. | |
| 2012/0281696 A1 | 11/2012 | Pohlmann et al. | |
| 2012/0321006 A1 | 12/2012 | Akita et al. | |
| 2013/0182795 A1 | 7/2013 | Cherian et al. | |
| 2013/0230035 A1 | 9/2013 | Grandhi et al. | |
| 2013/0294431 A1 | 11/2013 | Wang et al. | |
| 2014/0029511 A1 | 1/2014 | Park et al. | |
| 2014/0112229 A1 | 4/2014 | Merlin et al. | |
| 2014/0153460 A1 | 6/2014 | Shrivastava et al. | |
| 2015/0103727 A1 | 4/2015 | Zhang et al. | |
| 2015/0245290 A1 | 8/2015 | Liu | |
| 2016/0007288 A1 | 1/2016 | Samardzija et al. | |
| 2016/0100414 A1 | 4/2016 | Guvenkaya et al. | |
| 2016/0295511 A1 | 10/2016 | Qi et al. | |
| 2016/0380712 A1 | 12/2016 | Levy | |
| 2017/0064634 A1 | 3/2017 | Van Horn et al. | |
| 2017/0111820 A1 | 4/2017 | Wang et al. | |
| 2017/0111865 A1 | 4/2017 | Seok | |
| 2017/0111866 A1 | 4/2017 | Park et al. | |
| 2017/0134943 A1 | 5/2017 | Min et al. | |
| 2017/0136992 A1 | 5/2017 | Hamada et al. | |
| 2017/0295538 A1 | 10/2017 | Zhang et al. | |
| 2018/0007619 A1 | 1/2018 | Zhuang et al. | |
| 2018/0007629 A1 | 1/2018 | Dorrance et al. | |
| 2018/0013591 A1 | 1/2018 | Shafiee et al. | |
| 2018/0020397 A1 | 1/2018 | Aminaka et al. | |
| 2018/0176066 A1 | 6/2018 | Lim et al. | |

FOREIGN PATENT DOCUMENTS

| | | |
|---|---|---|
| CN | 101237438 A | 8/2008 |
| CN | 103138949 A | 6/2013 |
| CN | 104272797 A | 1/2015 |
| CN | 104301973 A | 1/2015 |
| CN | 105144649 A | 12/2015 |
| CN | 105723780 A | 6/2016 |
| EP | 2843892 A1 | 3/2015 |

OTHER PUBLICATIONS

U.S. Appl. No. 62/362,455, titled "Security Design for a Wake Up Frame", filed Jul. 14, 2016.
U.S. Appl. No. 62/404,987, titled "Wake Up Radio Frame With Spectrum Spreading Based Single Carrier", filed Oct. 6, 2016.
U.S. Appl. No. 62/405,517, titled "Wake Up Radio Frame With OFDM Based OOK Data", filed Oct. 7, 2016.
U.S. Appl. No. 62/426,843, titled "Spectrum Spreading for OOK Based Single Carrier Wake Up Radio Frame", filed Nov. 28, 2016.

* cited by examiner

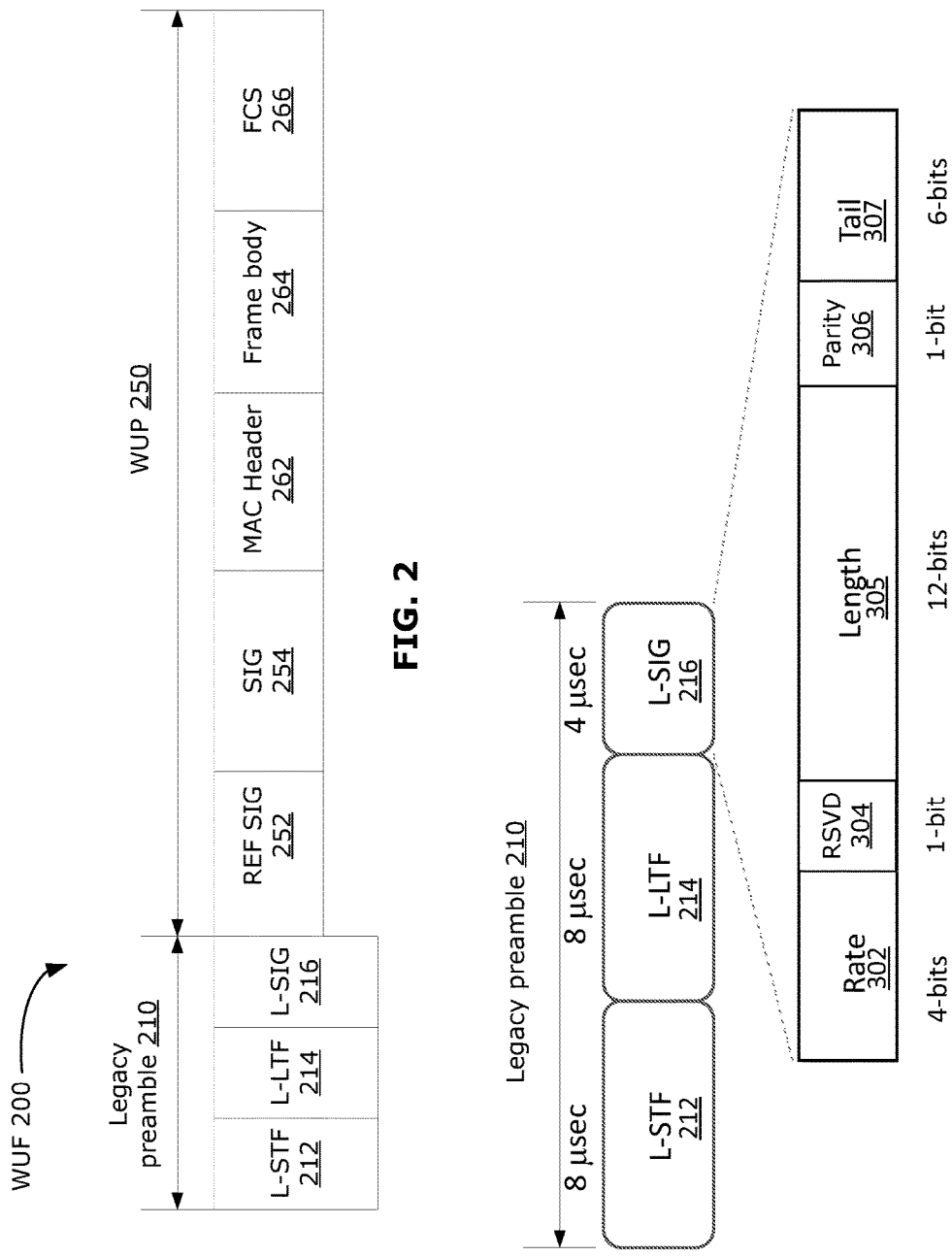

WAKE-UP-RECEIVER FRAME PERMITTING IDENTIFICATION BY NON-COMPATIBLE RECEIVER

RELATED APPLICATIONS

The present application claims priority from U.S. provisional patent application No. 62/362,473, filed Jul. 14, 2016; and U.S. provisional patent application No. 62/441,687, filed Jan. 3, 2017, the entireties of which are hereby incorporated by reference.

FIELD

The present application relates to methods and systems for communicating with a wake-up receiver, including design of a wake-up frame detectable by a wake-up receiver and identifiable as a not valid frame by an incompatible receiver.

BACKGROUND

In wireless communication, efficient use of the available power is one of the main goals of system design. Often, a wireless local area network (WLAN) device, such as in Internet of Things (IoT) applications, relies on a limited power supply (e.g., as supplied by rechargeable or non-rechargeable batteries). Examples of such a device may include sensor devices located in remote fields measuring some physical phenomenon, e.g., water level or temperature; and wearable devices measuring some bodily function, e.g., pulse rate.

Such a device may be designed to operate on a low duty cycle (e.g., communicating with an access point (AP) only once per day) and thus it may not be appropriate for its main WLAN receiver circuit to be always on. The limited power supply (e.g., battery) of the device may be quickly exhausted if not provided with an appropriate sleep mode for the WLAN receiver circuit and an appropriate wake-up mechanism. The wake-up mechanism may involve transmission of a wake-up signal from the AP to the device and from the device to the AP.

In an environment where legacy devices that are not wake-up-enabled operate in overlapping coverage areas with wake-up enabled devices it may be beneficial that the wake-up signal be easily identifiable by such legacy devices as a non-valid signal.

SUMMARY

In examples disclosed herein, a wake-up frame is described in which the wake-up frame includes a legacy preamble that allows legacy devices to have early recognition that the incoming frame is not a valid frame for certain types of legacy devices, e.g., IEEE 802.11a, 802.11ac and 802.11ax devices.

According to one example aspect, the present disclosure describes a method including transmitting a low-power wake-up signal. The wake-up signal includes a wake-up frame including a legacy preamble decodable by legacy electronic devices (EDs) and a wake-up packet decodable by a wake-up receiver circuit in a non-legacy ED. The legacy preamble includes information detectable by at least one of the legacy devices indicating that the wake-up signal is not a valid signal for the at least one legacy device.

According to another example aspect, the present disclosure describes an access point includes a processor. The processor is configured to execute computer-readable instructions to cause the access point to transmit a low-power wake-up signal. The wake-up signal includes a wake-up frame including a legacy preamble decodable by legacy electronic devices (EDs) and a wake-up packet decodable by a wake-up receiver circuit in a non-legacy ED. The legacy preamble includes information detectable by at least one of the legacy EDs indicating that the wake-up frame is not a valid frame for the at least one legacy ED.

According to another example aspect, the present disclosure describes a method including receiving a wake-up signal. The wake-up signal includes a wake-up frame including a legacy preamble decodable by the legacy electronic device (ED) and a wake-up packet decodable by a wake-up receiver circuit of a non-legacy ED. The method also includes detecting information in the legacy preamble indicating that the wake-up frame is not a valid frame for the legacy ED, for example where the legacy ED is a IEEE 802.11n, 802.11ac or 802.11ax device.

In any of the previous aspects/embodiments, the method may also include deferring from accessing a channel on which the wake-up signal was received, for a time duration according to values contained in a rate field and a length field of the legacy preamble.

In any of the previous aspects/embodiments, the legacy preamble may include a rate field, and the information may include a rate value in the rate field indicating a rate that is not used by the at least one legacy ED.

In any of the previous aspects/embodiments, the information may be encoded using a signal constellation in an additional field appended to the legacy preamble. The signal constellation may be rotated relative to another signal constellation used in previous fields of the legacy preamble.

In any of the previous aspects/embodiments, the legacy EDs may include one or more of legacy IEEE 802.11 n/ac/ax compliant devices, and the information may include a valid 802.11 rate value that is not 6 Mbps in a rate field of the legacy preamble.

In any of the previous aspects/embodiments, the rate value may be 9 Mbps.

In any of the previous aspects/embodiments, the legacy EDs may include one or more of legacy IEEE 802.11 a/n/ac/ax compliant devices, and the information may include a non-valid rate value in a rate field of the legacy preamble.

In any of the previous aspects/embodiments, the method may be for waking up a non-legacy ED having a wake-up receiver circuit.

In any of the previous aspects/embodiments, the method may be for identifying a wake-up frame to non-wake-up frame enabled legacy EDs.

BRIEF DESCRIPTION OF THE DRAWINGS

Reference will now be made, by way of example, to the accompanying drawings which show example embodiments of the present application, and in which:

FIG. 2 illustrates an example frame format for an example wake-up frame;

FIG. 3 illustrates a legacy preamble of the wake-up frame of FIG. 2 according to an example embodiment

Similar reference numerals may have been used in different figures to denote similar components.

DESCRIPTION OF EXAMPLE EMBODIMENTS

A user device or station such as a machine type device, a sensor device, or more generally an electronic device (ED), that is intended to operate in a wireless network such as a wireless local area network (WLAN) may have a separate low-power wake-up receiver (WUR) circuit (which may be also referred to as a wake-up radio circuit) in addition to a normal WLAN transceiver circuit. A WUR circuit is generally a low-power receiver circuit designed for receiving and detecting a wake-up signal, and may in some examples be a simplified version of the main WLAN transceiver circuit and may be implemented on integrated circuit (IC) or chip. The WUR circuit communicates with the WLAN transceiver circuit, or other equivalent circuit, of the device, so the WLAN transceiver circuit may sleep and conserve power until the WUR circuit wakes up the WLAN transceiver circuit. The WUR circuit wakes up the WLAN transceiver circuit, or other equivalent circuit, when the WUR circuit detects a wake-up signal from an access point (AP) (typically, an AP associated with the WLAN device).

Figure 1:
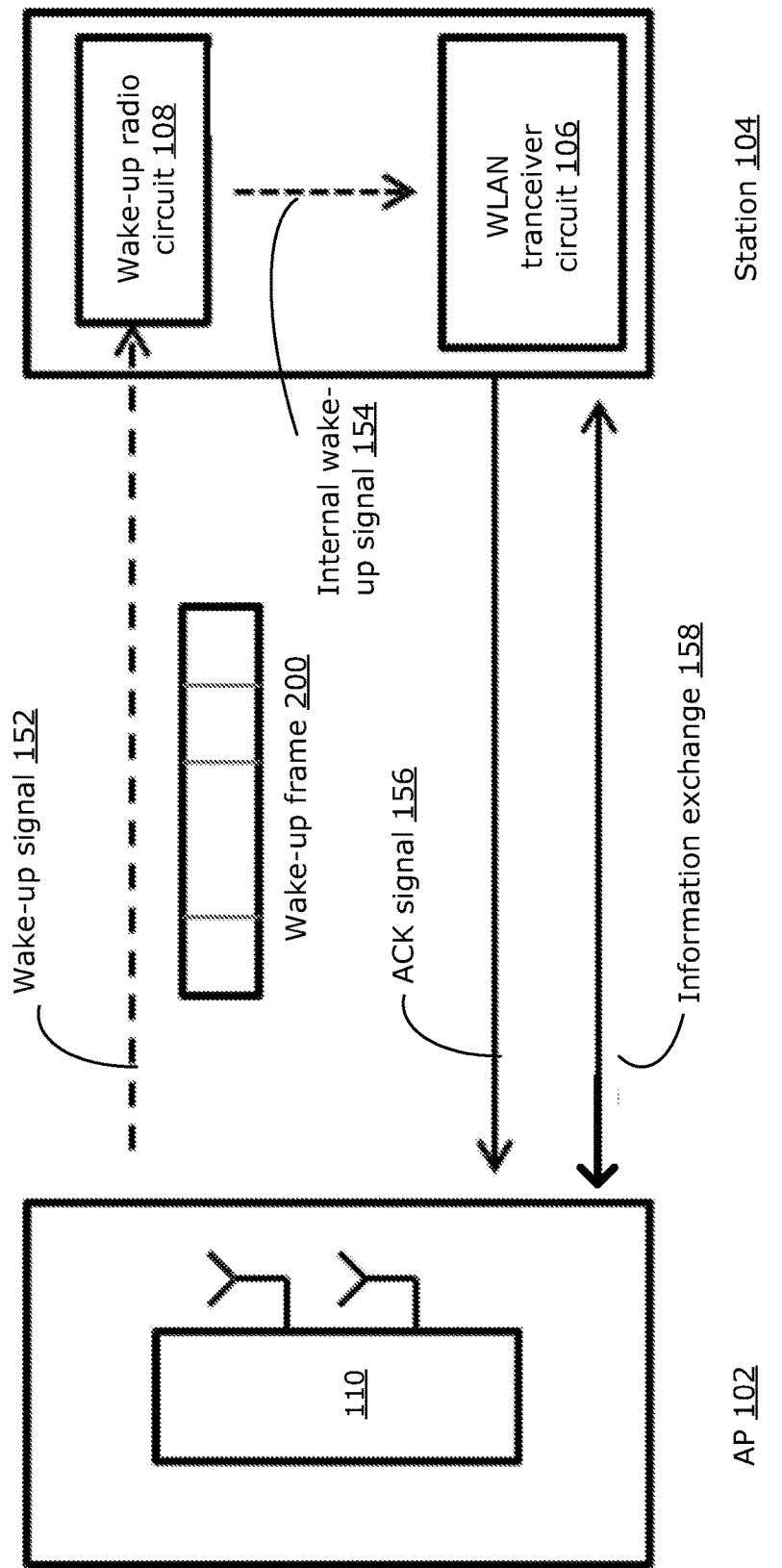
FIG. 1 is a block diagram illustrating communications between an AP and an example station having a wake-up receiver circuit.

In this regard, FIG. 1 is a schematic diagram illustrating an example AP 102 and an example station 104 (e.g. a low duty cycle WLAN device or other electronic device) associated with the AP 102. The example station 104 includes a WLAN transceiver circuit 106 (e.g., a Wi-Fi transceiver) and a WUR circuit 108 (also referred to simply as a WUR). The AP 102 includes WLAN transceiver circuit 110. The AP 102 may also include a processor (not shown) coupled to the transceiver circuit 110 for providing signals to and receiving signals from the transceiver circuit 110.

FIG. 1 illustrates a set of example signals that may be communicated for waking up a sleeping WLAN receiver circuit 106. The AP 102 may send a wake-up signal 152, carrying a Wake-Up-Frame (WUF) 200 (described further below) to the station 104. The WUF 200 is detected by the WUR circuit 108, and the WUR circuit 108 sends an internal wake-up signal 154 to the WLAN receiver circuit 106, waking up the WLAN transceiver circuit 106 if the WLAN receiver circuit 106 is in sleep mode. The WLAN transceiver circuit 106 then sends an ACK signal 156 back to the AP 102. Appropriate information exchange 158 between the AP 102 and the station 104 (via the WLAN transceiver circuit 106) may then take place. After the information exchange 158 is finished, the WLAN transceiver circuit 106 may return to the sleep state. The station 104 may include a processor (not shown), that may be part of the WUR circuit 108 for receiving and processing received wake-up signals 152, and for generating the internal wake-up signal 154.

Although FIG. 1 shows wakeup signal 152 being communicated to a WUR circuit 108 that is associated with a WLAN transceiver circuit 106, the processes and systems described in the present disclosure may be applicable to other circuits, including other wireless receiver circuits, which may benefit from a wake-up mechanism.

Example embodiments described herein may be implemented using IEEE 802.11 technology.

An example frame format for an example WUF 200 is shown in FIG. 2. In the example of FIG. 2, the WUF 200 includes a legacy preamble 210 pre-pended to a non-legacy wake-up portion or packet (WUP) 250. The WUP 250 includes a WUR-Reference Signal (REF SIG) field 252, a WUR signal (SIG) field 254, a MAC header 262, a frame body 264 and a frame check sequence (FCS) 266. In the 802.11 environment, legacy preamble 210 is an orthogonal frequency-division multiplexing (OFDM) signal. In some example embodiments, the WUP 250 portion of WUF 200 is communicated using a single carrier (SC), and in some example embodiments the WUP 250 portion of WUF 200 is communicated using multi-carrier modulation such as OFDM. The WUP 250 is decodable by the WUR circuit of a WUR-enabled device (also referred to as non-legacy device).

The legacy preamble 210, which is also referred to as the non-High Throughput (non-HT) preamble, is used for coexistence with other IEEE 802.11 devices and serves to silence all non-destination WLAN devices during the transmission of the WUF 200. In this regard, the legacy preamble 210 is decodable by non-WUR enabled legacy 802.11 devices (for example legacy 802.11a/n/ac/ax devices) and non-legacy WUP 250 is decodable by WUR enabled devices such WUR 108. The legacy preamble 210 includes a legacy short training field (L-STF) 212, a legacy long training field (L-LTF) 214, and a legacy signal (L-SIG) field 216. The legacy preamble 210 is generally 20 MHz wide in bandwidth (BW), in accordance with 802.11 wireless LAN standards. As represented by the relative heights of the legacy preamble 210 and WUP 250 in FIG. 2, WUP 250 may be narrower in BW than the legacy preamble 210, for example the WUP 250 may be 4 MHz in BW, although other BWs may also be suitable and in some examples the WUP 250 may have the same BW as the legacy preamble 210.

Example configurations of the WUP 250 and suitable transmitter and WUR configurations can be seen for example in: U.S. Patent Application Ser. No. 62/362,473 filed Jul. 14, 2016; U.S. Patent Application Ser. No. 62/362,455 filed Jul. 14, 2016; U.S. Patent Application Ser. No. 62/404,987 filed Oct. 6, 2016; U.S. Patent Application Ser. No. 62/405,517 filed Oct. 7, 2016 and U.S. Patent Application Ser. No. 62/426,843 filed Nov. 28, 2016, the contents of which are all incorporated herein by reference.

The present description primarily relates to the design of legacy preamble 210 to efficiently enable non-destination devices that are not WUR enabled to recognize that an incoming WUF 200 is not a valid frame for that device. Such non-WUR enabled devices could for example include 802.11a/n/ac/ax compatible devices that do not have a WUR circuit. To this end, in example embodiments, a transmitting device (for example AP 102) is configured to manipulate the bits of the legacy 802.11 preamble 210 (which is available at the beginning of every 802.11 frame) such that a non-WUR enabled receiving device can recognize that the WUF 200 is not a valid frame.

In one example embodiment the legacy SIG (L-SIG) field 216 is manipulated to provide a quick validity check mechanism. As shown in FIG. 3, the L-SIG field 216 includes the following sub-fields: Rate field 302, a reserved (RSVD) bit 304, Length field 305, Parity bit 306 and Tail field 307. The bit-lengths of each of these-sub fields are indicated in FIG. 3. Valid values for the Rate field 302 for the legacy preamble 210, in accordance with legacy 802.11 include 6, 9, 12, 18, 24, 36, 48, and 54 Mbps. The value of the Length field 305 is typically set equal to the frame length that follows the legacy preamble 210.

The use of the Rate and Length fields 302, 305 in the L-SIG field 216 in different 802.11 frame types is as follows:
  802.11a: The Rate and Length fields 302, 305 are combined together to provide the duration of the transmitted frame.
  802.11n/ac/ax: the Rate field 302 is always set to 6 Mbps and together with the Length field 305 they define the period of time for which a legacy 802.11 (802.11a) device needs to defer and stop competing for the shared media. Setting the rate at the lowest possible value (6 Mbps) allows the definition of the maximum possible value for defer time. The maximum possible value for the defer time, according to 802.11a, is around 5 msec.

Accordingly, when the value of the Rate field 302 is set to any allowed value (9, 12, 18, 24, 36, 48, and 54 Mbps) other than 6 Mbps, legacy 802.11n/ac/ax devices will decode the value of the Rate field 302 and then go to power save mode for a predetermined duration (as determined by the Rate and Length fields 302, 305) because the legacy devices consider the received frame to be likely an 802.11a frame if the value of the Rate field 302 is a valid value and is different from 6 Mbps. Alternatively, a legacy 802.11/n/ac/ax device may treat the received frame as an 802.11a frame and may process the frame according to 802.11a, such as by decoding it accordingly.

A first example embodiment exploits the fact that legacy 802.11n/ac/ax devices will go to power save mode if the Rate field 302 has a valid value other than 6 Mbps. In particular, in an example embodiment, the AP sets the Rate field 302 in the legacy preamble 210 of WUF 200 to a valid value (e.g. one of 9, 12, 18, 24, 36, 48, and 54 Mbps) that is not 6 Mbps. In such a situation, a legacy IEEE 802.11n/ac/ax device will decode the Rate and the Length fields 302, 305 and realize that the incoming frame is not of its type (because the value in the Rate field 302 is not equal to 6 Mbps). The receiving legacy device will then defer and will not compete for the medium (e.g., the channel on which the WUF 200 was received) for a time as indicated by the values contained in the Rate and Length fields 302, 305, in accordance with the legacy 802.11n/ac/ax standard.

In one example embodiment, the Rate field 302 is set at 9 Mbps. Setting the value of the Rate field 302 at 9 Mbps has the effect of reducing the maximum defer time below 5 msec. The length of WUF 200 will typically be short as it is intended to be used in a power constrained environment, and accordingly setting the value of the Rate field 302 to 9 Mbps should be sufficient to ensure that a legacy IEEE 802.11n/ac/ax device is not silenced for a time that is shorter than the maximum allowed length of WUF 200.

It is noted that a legacy IEEE 802.11a will not be deterred by a Rate field 302 set to a valid value other than 6 Mbps and that such a device will correctly decode the entire legacy preamble 210 until it reaches WUP 250, which a legacy 802.11a device cannot decode. Accordingly, although the use of a valid value in the Rate field 302 that is not 6 Mbps is a suitable mechanism for silencing legacy 802.11n/ac/ax devices, it is not as suitable for legacy 802.11a devices. In some example embodiments, this shortcoming is accepted on the assumption that 802.11a devices are quickly being replaced by advanced 802.11 devices and thus there is limited benefit for introducing a special arrangement for legacy 802.11a devices.

In another example embodiment, rather than setting the value of Rate field 302 to a valid value that is not 6 Mbps, the Rate field 302 is set to a value that is not allowed, for example 3 Mbps. In such a case all IEEE 802.11a/n/ac/ax devices will stop decoding the WUF 200 as the invalid value in the Rate field 302 will indicate that the incoming WUF 200 is not a valid frame. However, such a method does not allow legacy 802.11n/ac/ax devices to defer and not compete for the medium for a period of time. Alternatively, the legacy device may check a parity bit and, if the parity bit is valid, the legacy device may use the information contained in the Length field 305 and an available rate value (e.g., a previously set rate value) for deferring access to the medium.

It will thus be appreciated that when the value of the Rate field 302 is set to an allowed value that is not 6 Mbps, legacy IEEE 802.11n/ac/ax devices will be able to detect that the incoming frame is not of their type and will also defer and not compete for the medium for a duration determined by the Rate field 302 and the Length field 305.

Figure 4:
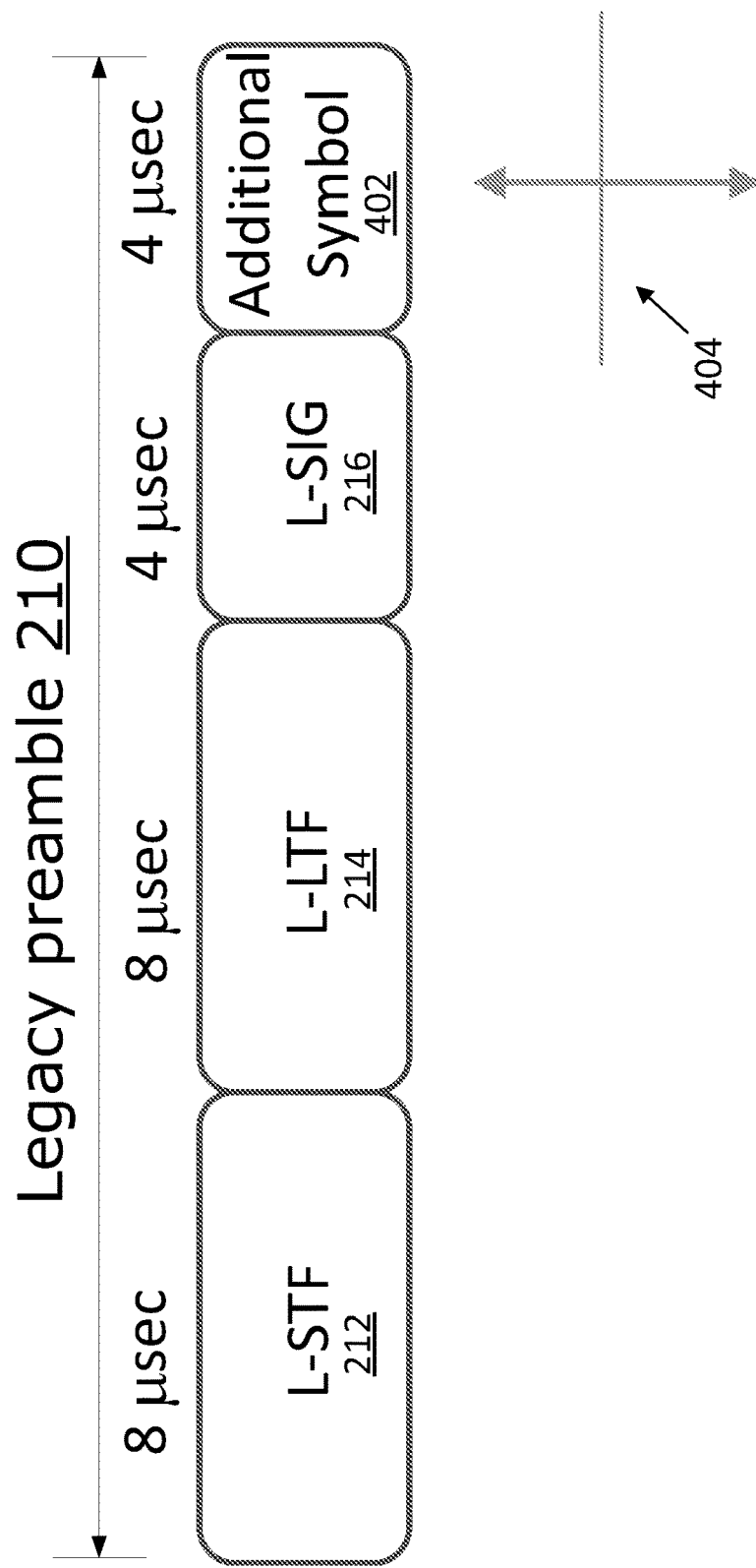
FIG. 4 illustrates a legacy preamble with additional symbol for use in the wake-up frame of FIG. 2 according to an example embodiment.

In a further example embodiment, an additional symbol is included at the end of the legacy preamble 210 as shown in FIG. 4. In such an example, the Rate field 302 is set to 9 Mbps, and on that basis legacy IEEE 802.11n/ac/ax devices will be able to detect that the incoming frame is not of their type and will defer and not compete for the medium. Alternatively, a legacy IEEE 802.11n/ac/ax device may behave like a legacy 802.11a device and continue to decode the incoming frame as a 802.11a frame. Regarding legacy 802.11a devices, the modulation and the coding rate for the additional symbol 402 follows those defined for 9 Mbps for 802.11a devices, and accordingly the modulation is set to binary phase-shift keying (BPSK) and the coding rate is ¾. However, the signal constellation for the additional symbol 402 is rotated by 90 degrees, relative to the signal constellation used in the previous fields of the legacy preamble, to cause 802.11a devices to skip decoding (it will be appreciated that this is the same technique used for 802.11n auto detection). The rotated constellation is represented by coordinates 404 in FIG. 4. In an example embodiment, the additional symbol field 402 has the same 20 MHz BW as the rest of the legacy preamble 210 and has a 4 μsec duration.

In some example embodiments, the WUR circuit 108 in a WUR enabled device will be unable to detect the 20 MHz OFDM legacy preamble 210. However, in some example embodiments, WUR circuit 108 may be capable of decoding an OFDM signal on the 20 MHz BW channel, in which case the additional symbol 402 could serve an additional purpose of carrying useful information related to the narrow band signal location of WUP 250 in the 20 MHz BW channel. For example, the additional symbol 402 may carry a signature sequence, which may be useful for forward compatibility with future 802.11 amendments. Also, the spectral location of the additional symbol 402 may indicate whether the wake-up signal is at the middle, lower edge, or upper edge of the spectrum of the channel (e.g., 20 MHz channel).

Examples of the present disclosure may be implemented by an AP having a processor coupled to a transmitter to format and transmit the WUF as described above. Examples of the present disclosure may also be implemented by a legacy device having a processor coupled to a receiver to receive and process the WUF as described above.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
   transmitting a low-power wake-up signal, the wake-up signal comprising a wake-up frame including a legacy preamble decodable by legacy electronic devices (EDs) and a wake-up packet decodable by a wake-up receiver circuit in a non-legacy ED;
   wherein the legacy preamble includes information detectable by at least one of the legacy EDs indicating that the wake-up frame is not a valid frame for the at least one legacy ED.

2. The method of claim 1 wherein the legacy preamble includes a rate field and the information includes a rate value in the rate field indicating a rate that is not used by the at least one legacy ED.

3. The method of claim 1 wherein the information is encoded using a signal constellation in an additional field appended to the legacy preamble, the signal constellation being rotated relative to another signal constellation used in previous fields of the legacy preamble.

4. The method of claim 1 wherein the legacy EDs include one or more of legacy IEEE 802.11 n/ac/ax compliant devices and the information includes a valid 802.11 rate value that is not 6 Mbps in a rate field of the legacy preamble.

5. The method of claim 4 wherein the rate value is 9 Mbps.

6. The method of claim 1 wherein the legacy EDs include one or more of legacy IEEE 802.11 a/n/ac/ax compliant devices and the information includes a non-valid rate value in a rate field of the legacy preamble.

7. An access point comprising a processor configured to execute computer-readable instructions to cause the access point to:
   transmit a low-power wake-up signal, the wake-up signal comprising a wake-up frame including a legacy preamble decodable by legacy electronic devices (EDs) and a wake-up packet decodable by a wake-up receiver circuit in a non-legacy ED;
   wherein the legacy preamble includes information detectable by at least one of the legacy EDs indicating that the wake-up frame is not a valid frame for the at least one legacy ED.

8. The access point of claim 7 wherein the legacy preamble includes a rate field and the information includes a rate value in the rate field indicating a rate that is not used by the at least one legacy ED.

9. The access point of claim 7 wherein the information is encoded using a signal constellation in an additional field appended to the legacy preamble, the signal constellation being rotated relative to another signal constellation used in previous fields of the legacy preamble.

10. The access point of claim 7 wherein the legacy EDs include one or more of legacy IEEE 802.11 n/ac/ax compliant devices and the information includes a valid 802.11 rate value that is not 6 Mbps in a rate field of the legacy preamble.

11. The access point of claim 10 wherein the rate value is 9 Mbps.

12. The access point of claim 7 wherein the legacy EDs include one or more of legacy IEEE 802.11 a/n/ac/ax compliant devices and the information includes a non-valid rate value in a rate field of the legacy preamble.

13. A method comprising:
   receiving a wake-up signal, the wake-up signal comprising a wake-up frame including a legacy preamble decodable by a legacy electronic device (ED) and a wake-up packet decodable by a wake-up receiver circuit of a non-legacy ED;
   detecting information in the legacy preamble indicating that the wake-up frame is not a valid frame for the legacy ED.

14. The method of claim 13, further comprising:
   deferring from accessing a channel on which the wake-up signal was received, for a time duration according to values contained in a rate field and a length field of the legacy preamble.

15. The method of claim 13 wherein the legacy preamble includes a rate field and the information includes a rate value in the rate field indicating a rate that is not used by the legacy ED.

16. The method of claim 13 wherein the information is encoded using a signal constellation in an additional field appended to the legacy preamble, the signal constellation being rotated relative to another signal constellation used in previous fields of the legacy preamble.

17. The method of claim 13 wherein the legacy ED is a legacy IEEE 802.11 n/ac/ax compliant device and the information includes a valid 802.11 rate value that is not 6 Mbps in a rate field of the legacy preamble.

18. The of claim 17, wherein the legacy ED further decodes the wake-up frame according to IEEE 802.11a.

19. The method of claim 17 wherein the rate value is 9 Mbps.

20. The method of claim 13 wherein the legacy ED is a legacy IEEE 802.11 a/n/ac/ax compliant device and the information includes a non-valid rate value in a rate field of the legacy preamble.

* * * * *